Figure 1:
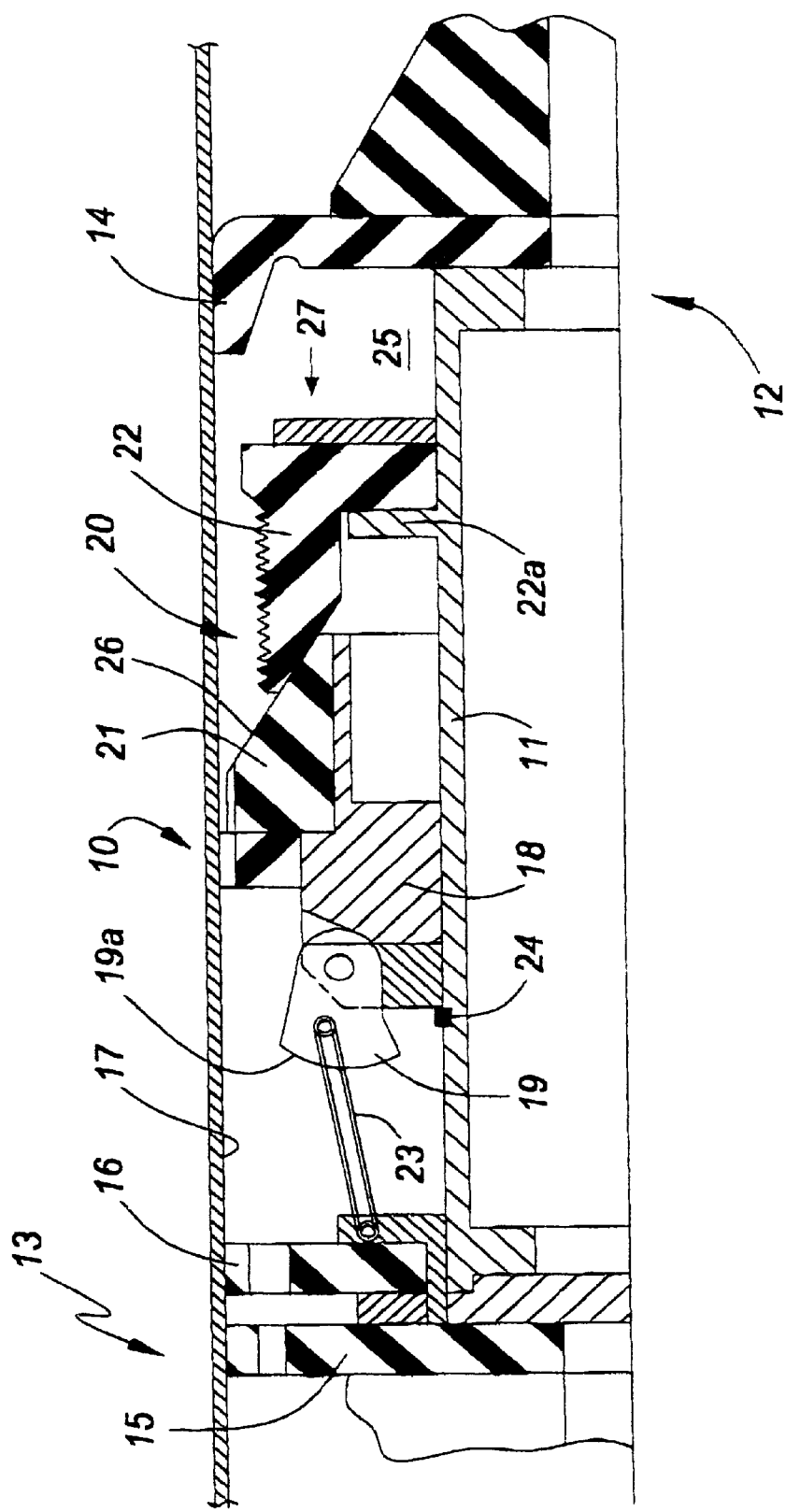

United States Patent [19]
Friedrich et al.

[11] Patent Number: 6,129,118
[45] Date of Patent: Oct. 10, 2000

[54] DOWNSTREAM PLUG

[75] Inventors: Jaromir Friedrich; Donald D. Savard; Bronislav Walter, all of Edmonton, Canada

[73] Assignee: PA - Plug Inc., Edmonton, Canada

[21] Appl. No.: 09/306,267

[22] Filed: May 6, 1999

[30] Foreign Application Priority Data

May 8, 1998 [CA] Canada ................................ 2237257

[51] Int. Cl.[7] .................................................. F16L 55/10
[52] U.S. Cl. .......................... 138/89; 138/97; 166/122; 166/135
[58] Field of Search ................. 138/89, 97; 166/134, 166/135, 122, 187, 192

[56] References Cited

U.S. PATENT DOCUMENTS

| | | | |
|---|---|---|---|
| 4,494,584 | 1/1985 | Rogononi | 138/89 |
| 4,498,811 | 2/1985 | Fern et al. | 138/89 |
| 4,612,961 | 9/1986 | Vetter | 138/93 |
| 4,708,202 | 11/1987 | Sukup et al. | 166/122 |
| 4,804,018 | 2/1989 | Carr et al. | 138/93 |
| 4,852,391 | 8/1989 | Ruch et al. | 73/40.5 |
| 4,852,614 | 8/1989 | Johansen et al. | 138/93 |
| 4,854,384 | 8/1989 | Campbell | 166/122 |
| 4,875,615 | 10/1989 | Savard | 138/89 |
| 4,909,281 | 3/1990 | Reaux | 138/89 |
| 4,991,651 | 2/1991 | Campbell | 166/122 |
| 5,029,614 | 7/1991 | Lara et al. | 138/89 |
| 5,293,905 | 3/1994 | Friedrich | 138/89 |

FOREIGN PATENT DOCUMENTS 0659256  12/1996  European Pat. Off. .

OTHER PUBLICATIONS

Fracmaster Brochure "Multi–Set ISO–Tool" published prior to May 6, 1998 but after Mar. 15, 1994 (exact date and title of publication unknown) (only the two enclosed pages being available to Applicant).

*Primary Examiner*—Patrick Brinson
*Attorney, Agent, or Firm*—Hovey, Williams, Timmons & Collins

[57] ABSTRACT

A downstream plug is disclosed of a simplified structure where a dragging disc is used at a rear end to induce the expansion of locking elements engaging the pipeline. The locking results in an expansion cone being firmly held in place and forming a solid counterpart to the elastomeric seal expanded by the cone.

7 Claims, 3 Drawing Sheets

DOWNSTREAM PLUG

The invention relates to plugs or pigs used in isolating a section of a pipeline from the fluid of the pipeline to facilitate repairs, maintenance or other tasks such as installation of valves. In particular, the invention relates to plugs where the fluid present in the pipeline is not only used to propel the plug to the desired location in the pipeline, but also serves the purpose of activating the plug at such location by an appropriate manipulation of pressure of the fluid upstream or downstream of the plug. Still more specifically, the invention relates to a downstream pipeline plug, i.e. the plug intended to block fluid in the pipeline between a section which is to be isolated from the fluid, and that portion of the pipeline which is downstream from the isolated section, from the standpoint of the direction of flow in the pipeline during regular operation.

In an invention, commonly assigned to the present applicant, and described in U.S. Pat. No. 5,293,905 (Friedrich), a downstream plug is described which has a body, a leading disc at the downstream end of the body, a dragging device normally at a trailing or upstream end of the body, a locking mechanism adapted to lock the body in a predetermined location of the pipeline, and an elastomeric seal assembly adapted to become expanded at the desired location to provide the desired sealing effect.

While the downstream plug shown in the above reference has been used successfully in many applications, it has been determined that the structure of a fluid pressure activated plug of this type can be provided which is of a simpler structure and yet provides an even more reliable operation in use.

It is accordingly an object of the invention to provide an improved pipeline plug of the kind presented by the above patent, which plug would be of a simpler and thus less expensive structure and would at the same time provide a simpler and thus more reliable overall operation during the passage through the pipeline and in securing the plug in place.

In general terms, the invention provides a downstream plug for isolating a predetermined region of a pipeline from a downstream section of a pipeline, comprising, in combination:
(a) an elongated body having a front end portion, a rear end portion and guide means secured to the body for slidably guiding the body through the pipeline, as the plug is propelled, the front end first, by a fluid flow in the pipeline;
(b) a braking device generally freely longitudinally displaceable, along a predetermined length, relative to said body and adapted to provide a braking effect at points of contact between the braking device and the inner surface of the pipeline, whereby a dragging effect is generated between the braking device and the pipeline;
(c) a locking mechanism carriage generally freely longitudinally displaceable along a predetermined section of the body, said carriage pivotally supporting a plurality of radially expandable locking arms having outer surface portions adapted to lockingly engage, on expansion, the inner wall of the pipeline to lock the carriage relative to the pipeline;
(d) connecting mechanism disposed between said locking arms and said braking device for expanding or contracting the latter when the carriage and the braking device move relative to each other along the body;
(e) a seal assembly including an expanding member complementary and generally concentric with the pipeline and with an elastomeric expandable seal, to provide expansion of the seal when the expanding member and the expandable are displaced relative to each other along said body;
(f) fluid pressure translation means adapted to translate fluid pressure differential providing a higher pressure at said downstream end of the plug, into
  (i) a displacement of the carriage relative to the braking device to bring the locking arms into contact with the inside wall of the pipeline, and
  (ii) a displacement of the expanding member relative the expandable seal to expand the latter.

Preferably, the displacement of the carriage and of the expanding member are arranged to take place in that order. It is also preferred to arrange the connecting mechanism as a plurality of elongated rods or compression springs each having one end pivotally secured to the braking device and the other to one of said locking arms. The expanding member is a cone fixedly secured to said carriage, whereby the locking of the latter results in the locking of the position of the cone relative to the pipeline, while permitting displacement of said expandable seal towards said cone. The plug comprises, at a predetermined point, a stop provided on said body and adapted to limit the displacement of said carriage on said body in the direction towards said rear end of the body.

The guide means comprises, at said downstream end, an elastomeric sealing cup fixedly secured to the body and having an outside diameter slidingly compatible with the inside diameter of the pipeline. At said upstream or rear end of the body, a sliding ring is preferably disposed upstream of said braking means, fixedly secured to the body and having an outside diameter slidingly compatible with the inside diameter of the pipeline.

The prototype of the invention is now described with reference to the accompanying drawings.

Figure 2:
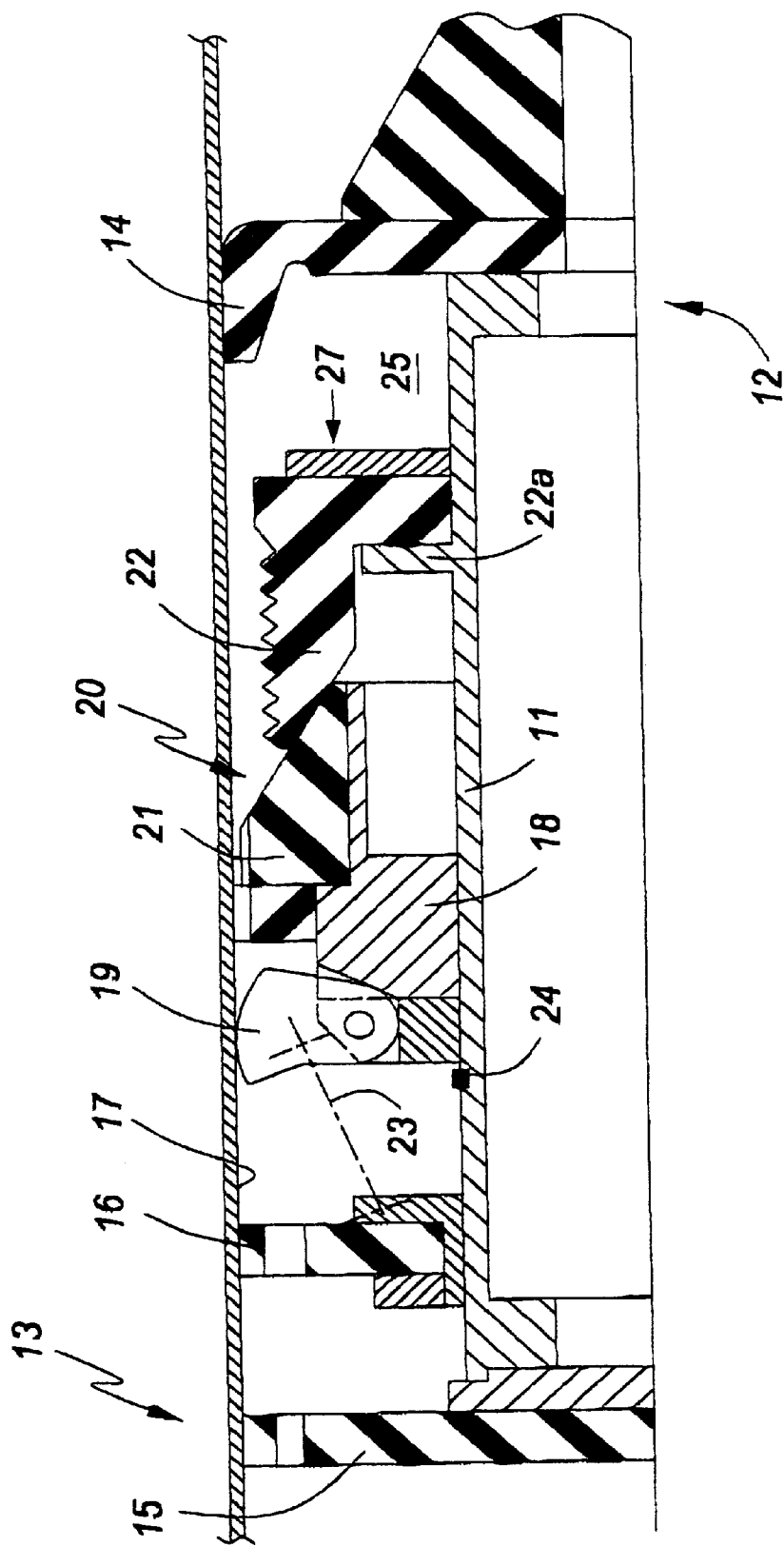
Figure 3:
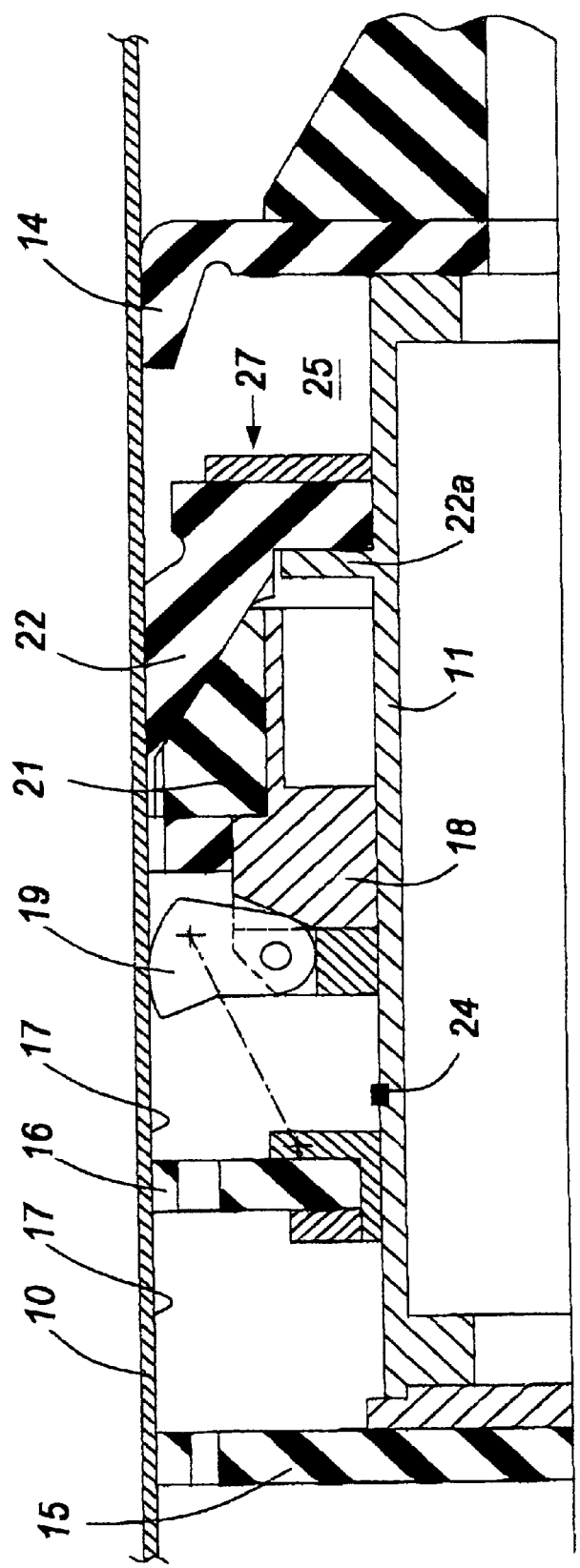

FIG. 1 is a simplified, diagrammatic, longitudinal section of a pipeline showing the plug in the state at which it is advanced by the flow of the fluid in the pipeline, from the left to the right;

FIG. 2 is a view similar to that of FIG. 1 but showing the plug at a first state activation, where the reversed pressure acting from the right to the left of the figure resulted in the locking of the carriage relative to the pipeline; and FIG. 3 is a view similar to that of FIG. 2 but showing the plug at a second and final state of activation, where continued pressure from the left of the plug to the right can no longer displace the locked carriage but provides displacement of the elastomeric seal over the expanding member or cone.

The plug 10 is provided with a tubular, elongated body 11 having a front or downstream end portion 12 and a rear or upstream end portion. There are two guide means provided in the embodiment shown. The front seal cup 14 and the rear guide ring 15. They serve the purpose of smoothly guiding the plug through the pipeline.

A braking device of the type of a ring 16 having a diameter and outside surface treatment provided for inducing a dragging effect at the contact of the ring 16 and the inner wall 17 of the pipeline. The ring 16 is freely displaceable along a section of the body 11. The section is limited by the expansion of the expansion arms, as will be later explained.

The plug is provided with a locking mechanism 18 comprised of a locking mechanism carriage which is freely slidable along the body 11 within a section limited, at the upstream end of the carriage 18, by a stop member 24. The carriage supports a plurality of locking arms 19. They have their outer surface portions or feet 19a adapted to lockingly engage the inner surface of the pipe wall.

There is a connecting mechanism disposed between the locking arms 19 and the brake ring 16. In the embodiment shown, the mechanism includes a number of elongated pressure springs or struts 23 pivotally secured at one end to the respective arm 19 and at the other to the brake ring or disc 16.

The sealing effect of the plug is carried out by a seal assembly 20 including an expanding member, in the embodiment shown, a cone 21, and an elastomeric expandable seal 22 having a hollow conical surface compatible with the cone 21. The seal 22 rests against a flange 22a integrally formed with or fixedly secured to the body 11.

Fluid pressure translation means are provided which enable a reversed pressure (from the right to the left of FIG. 1) to penetrate around the cup 14 into the inside space 25 to exert pressure at the exposed section 26 of the cone 21 and at the face portion 27 of the expandable seal 22 to cause the movement of certain elements relative to the body 11.

In operation, the plug is placed into a plug launcher and propelled through the pipeline in the state of FIG. 1.

When the desired location is reached, the flow previously propelling the plug is stopped and pressure of the fluid in the pipeline part downstream (to the right) of the plug is increased. The pressure proceeds around the seal or guide cup 14 and acts against the exposed part 26 of the cone 21 and against the face 27 of the seal 22. As the cone 21 is fixedly secured to the carriage 18, the carriage acts via the stop 24 to displace the body 11 against the original direction of flow.

The displacement of the carriage to the left is transmitted by the springs or struts 23 to the brake disc 16 which resists the movement along the pipe (as it did with respect to the movement caused by the flow of the fluid at the start). The dragging effect of the disc 16 is sufficient to cause sliding of the body 11 through the disc 16, expanding the arms 19 into contact with the wall of the pipeline. This is the situation of FIG. 2. The arms 19 may not be in a fully locked position but there is a partial locking force which, eventually, brings the arms 19 into full locking engagement with the pipeline. The carriage 18 and the cone 21 can no longer move relative to the pipeline.

Once the contact between the arms 19 and the wall 17 is established, the continued pressure acting from the right to the left results in displacement to the left of the seal 22 which presses on the flange 22a. The body 11 therefore slides through the carriage 18. At the same time, the movement eventually results in the expansion of the seal 22 (FIG. 3). Note that the stop 24 is now displaced to the left of the carriage 18 as the function of the locking arms 19 is not solely to hold the cone 21 firm relative to the pipeline.

Continued pressure at the front or downstream end 12 of the plug maintains the seal 22 engaged with the inside wall 17 of the pipeline and the locking arms 19 locked. The section to the left of the plug is now isolated from pressurized fluid in the pipeline downstream of the plug.

To release the tool the pressure differential is reversed. This will first push the seal 22 from the cone 21, to reach the position of FIG. 2. Then the front cup 14 becomes active again and pulls the body 11 to the right until the stop ring 24 engages the carriage 18. The carriage is now forced to the right with the resulting release of the 19 locking arms. After the release of the arms 19 from the locking contact with the inside wall 17, the arms 19 are again freely rotatable about their pivots so that the relatively small dragging force of the braking ring 16 combined with the advancement of the body 11 to the right eventually results in the folded state of FIG. 1.

Those skilled in the art will appreciate that various modifications of the simplified structure of the plug can be made without departing from the invention as set forth in the accompanying claims.

What is claimed is:

1. A plug for isolating a predetermined region of a pipeline from a downstream section of a pipeline, comprising, in combination:

(a) an elongated body having a front end portion, a rear end portion and guide means secured to the body for slidably guiding the body through the pipeline, as the plug is propelled, the front end first, by a fluid flow in the pipeline;

(b) a braking device generally freely longitudinally displaceable, along a predetermined length, relative to said body and adapted to provide a braking effect at points of contact between the braking device and the inner surface of the pipeline, whereby a dragging effect is generated between the braking device and the pipeline;

(c) a locking mechanism carriage generally freely longitudinally displaceable along a predetermined section of the body, said carriage pivotally supporting a plurality of radially expandable locking arms having outer surface portions adapted to lockingly engage, on expansion, the inner wall of the pipeline to lock the carriage relative to the pipeline;

(d) connecting mechanism disposed between said locking arms and said braking device for expanding or contracting the latter when the carriage and the braking device move relative to each other along the body;

(e) a seal assembly including an expanding member complementary and generally concentric with the pipeline and with an elastomeric expandable seal, to provide expansion of the seal when the expanding member and the expandable are displaced relative to each other along said body;

(f) fluid pressure translation means adapted to translate fluid pressure differential providing a higher pressure at said downstream end of the plug, into (i) a displacement of the carriage relative to the braking device to bring the locking arms into contact with the inside wall of the pipeline, and (ii) a displacement of the expanding member relative the expandable seal to expand the latter.

2. The plug of claim 1, wherein the expanding of the locking arms and of the seal are arranged to take place in that order.

3. The plug of claim 1, wherein the connecting mechanism is a plurality of elongated compression springs each having one end pivotally secured to the braking device and the other to one of said locking arms.

4. The plug of claim 1, wherein said expanding member is a cone fixedly secured to said carriage, whereby the locking of the latter results in the locking of the position of the cone relative to the pipeline, while permitting displacement of said expandable seal towards said cone.

5. The plug of claim 1, further comprising, at a predetermined point, a stop provided on said body and adapted to limit the displacement of said carriage on said body in the direction towards said rear end of the body.

6. The plug of claim 1, wherein said guide means comprises, at said front end portion, an elastomeric sealing cup fixedly secured to the body and having an outside diameter slidingly compatible with the inside diameter of the pipeline.

7. The plug of claim 1, wherein said guide means comprises, at said upstream or rear end of the body, a sliding ring disposed upstream of said braking means, fixedly secured to the body and having an outside diameter slidingly compatible with the inside diameter of the pipeline.

\* \* \* \* \*